No. 660,079.  
G. W. SNIPES.  
COMBINED PLANTER AND FERTILIZER DISTRIBUTER.  
(Application filed Feb. 20, 1900.)  
Patented Oct. 16, 1900.
(No Model.)  
2 Sheets—Sheet 1.
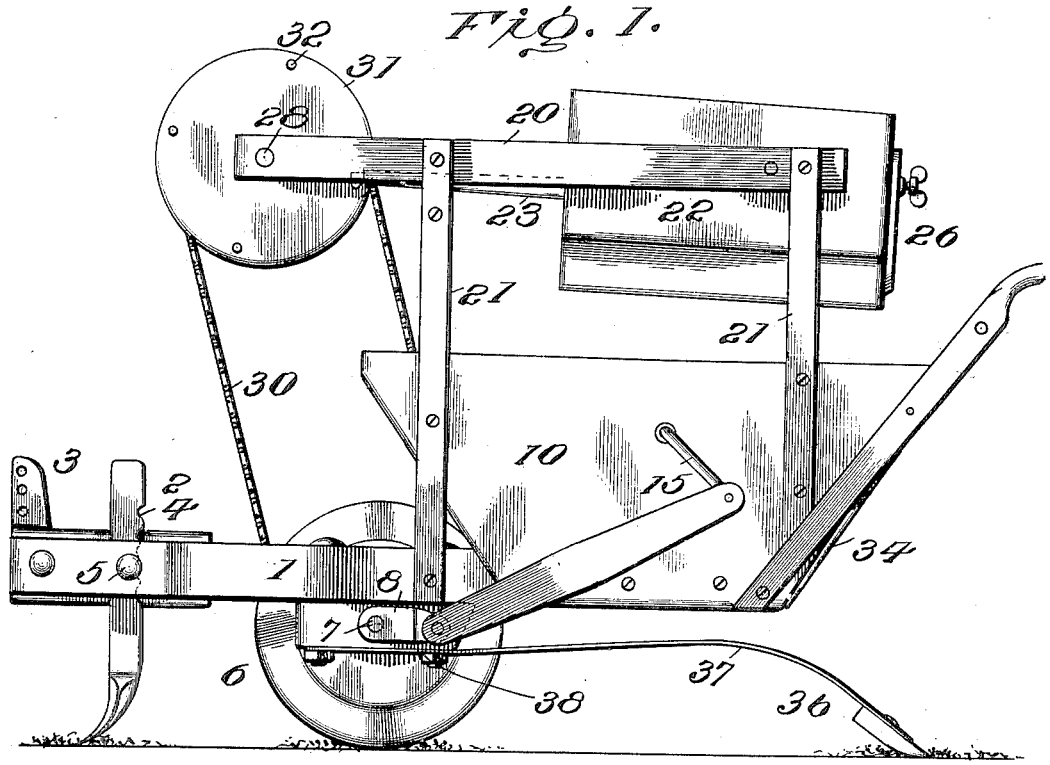
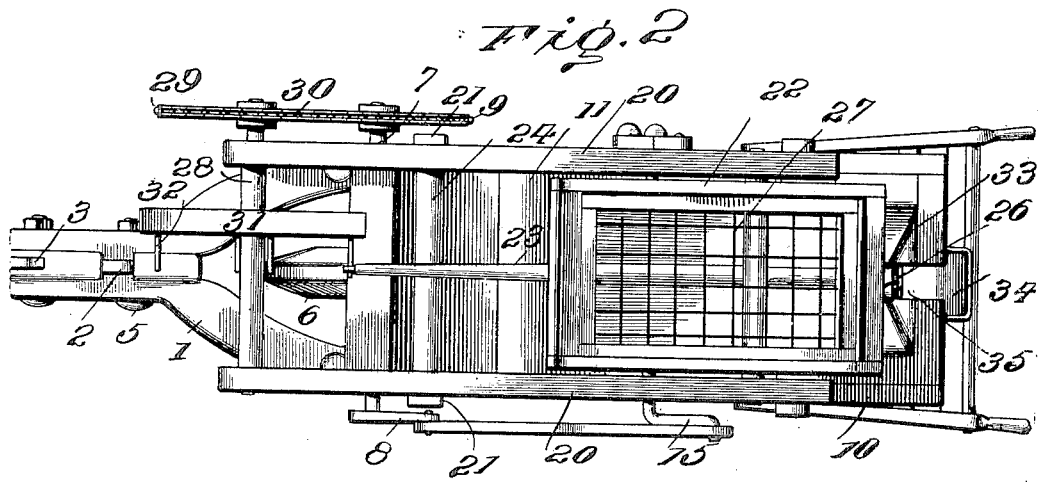

No. 660,079. Patented Oct. 16, 1900.
G. W. SNIPES.
COMBINED PLANTER AND FERTILIZER DISTRIBUTER.
(Application filed Feb. 20, 1900.)
(No Model.) 2 Sheets—Sheet 2.
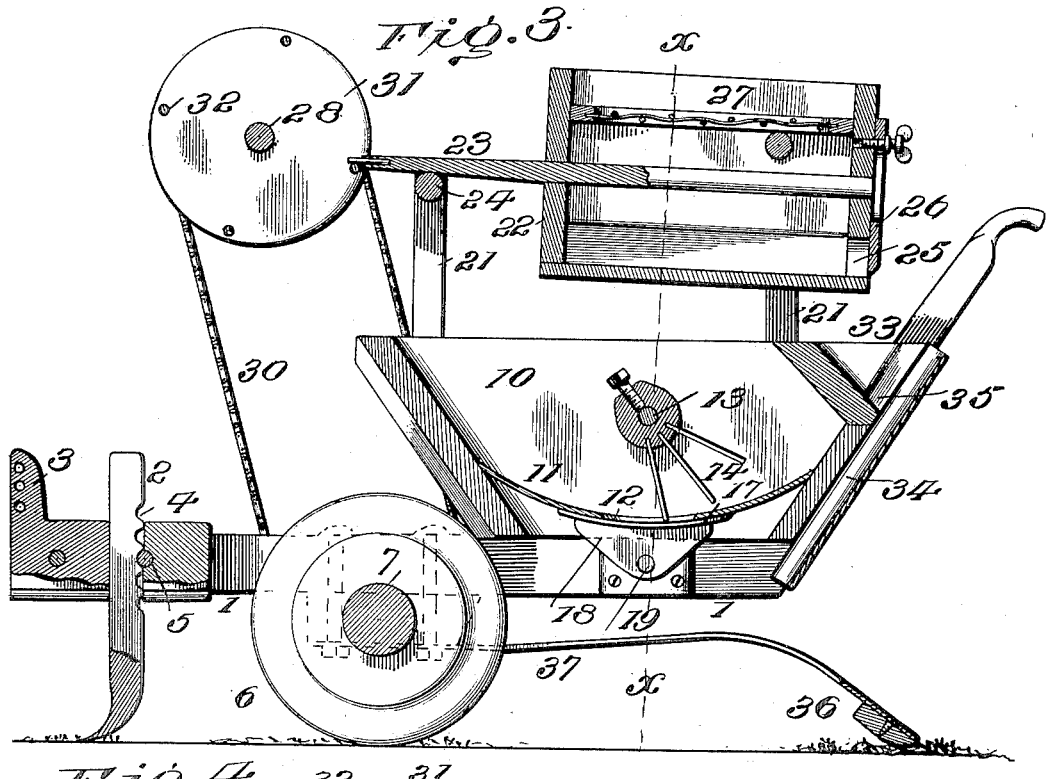
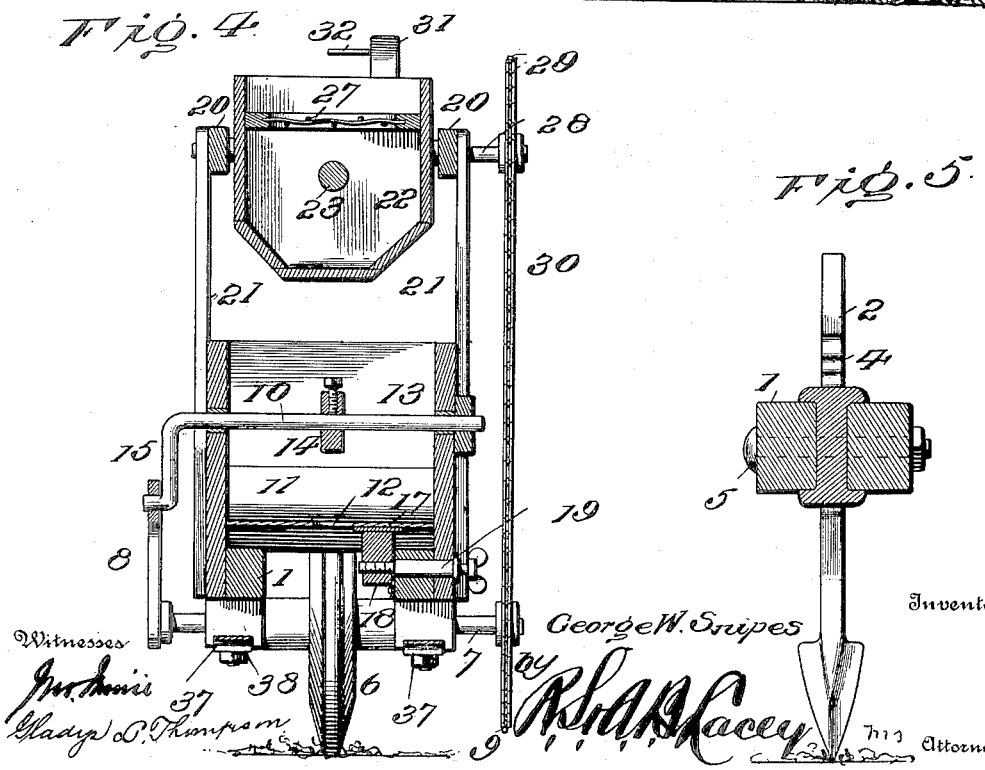
Witnesses
Inventor
George W. Snipes
Attorneys

UNITED STATES PATENT OFFICE.

GEORGE W. SNIPES, OF CONDOR, GEORGIA, ASSIGNOR OF ONE-HALF TO L. C. BEACHAM, OF DUBLIN, GEORGIA.

COMBINED PLANTER AND FERTILIZER-DISTRIBUTER.

SPECIFICATION forming part of Letters Patent No. 660,079, dated October 16, 1900.

Application filed February 20, 1900. Serial No. 5,951. (No model.)

*To all whom it may concern:*

Be it known that I, GEORGE W. SNIPES, a citizen of the United States, residing at Condor, in the county of Laurens and State of Georgia, have invented certain new and useful Improvements in a Combined Planter and Fertilizer-Distributer; and I do hereby declare the following to be a full, clear, and exact description of the invention, such as will enable others skilled in the art to which it appertains to make and use the same.

This invention has relation to the class of agricultural implements designed to simultaneously deposit seed and fertilizer in the same furrow, hill, or trench and which constantly agitate the seed to prevent its packing and cause forcible ejection of the seed from the hopper.

For a full description of the invention and the merits thereof and also to acquire a knowledge of the details of construction of the means for effecting the result reference is to be had to the following description and to the drawings hereto attached.

While the essential and characteristic features of the invention are necessarily susceptible of modification, still the preferred embodiment of the invention is illustrated in the accompanying drawings, in which—

Figure 1 is a side elevation of an implement constructed in accordance with and embodying the essential features of the invention. Fig. 2 is a top plan view. Fig. 3 is a central longitudinal section. Fig. 4 is a transverse section about on the line X X of Fig. 3 looking to the front. Fig. 5 is a detail section of the front portion of the frame just in rear of the bolt 5.

Corresponding and like parts are referred to in the following description and indicated in all the views of the drawings by the same reference characters.

The frame 1 is composed of longitudinal bars, having their forward portions inwardly deflected and receiving between them the shank 2 of the opener or burster, the latter being vertically adjustable to run deep or shallow, according to the required depth of the planting. The clevis or draft attachment 3 is likewise secured between the front ends of the frame-bars, and its vertical extension is formed with a series of openings for adjustable connection therewith of the team employed for drawing the implement over the field. The shank of the opener is formed in its rear edge with a series of notches 4 to receive the bolt 5, provided as means for connecting the frame-bars. When it is required to adjust the opener vertically, the bolt 5 is withdrawn and the shank moved up or down as required, and when adjusted the bolt is replaced and entering one of the notches 4 secures it in the required position.

A ground-wheel 6 is secured to the shaft or axle 7, mounted in bearings applied to the side bars of the frame 1. A crank 8 is applied to one end of the shaft or axle 7, and a sprocket-wheel 9 is secured to the opposite end thereof. The agitator is operated from the shaft 7 and the hopper carrying the fertilizer receives movement from the same source, the connections being more fully described hereinafter.

The hopper 10 is mounted upon the rear portion of the frame 1 and its front and rear walls slope downwardly and are connected by a curved bottom 11, in which is formed a longitudinal seed-opening 12. A transverse shaft 13 is journaled at its ends in the sides of the hopper 10 and is provided with a combined agitator and force-feeder 14 in line with the seed-opening 12 and composed of a central portion and radiating fingers. A crank 15, provided at the projecting end of the shaft 13, is connected by means of a rod with the crank 8 and is longer than the latter, whereby the shaft 13 has a rocking movement imparted thereto when the implement is drawn over the field. The seed-opening 12 is adapted to be contracted in width to regulate the amount of seed deposited and is controlled by means of a cut-off 17, arranged beneath the bottom 11 and secured to a block 18, attached to the inner end of an adjusting-screw 19, threaded into an opening formed in a side bar of the frame.

Upper longitudinal bars 20 are connected with the frame and hopper by means of vertical posts 21 to form therewith a supplementary frame and are located directly above the sides of the hopper 10. A vibrating hopper 22 is pivotally supported between the rear ends of the longitudinal bars 20 and is provided with a forwardly-extending pole 23, which normally rests upon the cross-bar 24, supported by the upper end portions of the forward vertical posts 21. This vibrating hopper is designed to receive the fertilizer, and the lower portions of its sides are inwardly convergent to prevent the lodgment of the fertilizer in the angles. A discharge-opening 25 is formed in the rear wall of the hopper 22 about in line with the bottom and is controlled by a slide 26, having adjustable connection with the rear wall of the hopper, said slide being longitudinally slotted and secured in located position by means of a binding-screw passing through the slot thereof. The hopper 22 normally inclines in a horizontal position, whereby the discharge-opening 25 occupies the lowermost position, so as to facilitate the egress of the fertilizer and insure the discharge of every particle. A screen 27 is located in the upper portion of the hopper 22 and receives the fertilizer when first supplied to the hopper, and its purpose is to lighten and loosen the fertilizer, so that it will not pack in the lower portion of the hopper, which would interfere with its free delivery in the manner presently to be stated.

Vibratory movement may be imparted to the hopper 22 in any suitable manner, the same being necessary to insure a positive feed of the fertilizer. In the preferred form of construction a shaft 28 is journaled to the front ends of the longitudinal bars 20 and is provided at one end with a sprocket-wheel 29, deriving its motion from the shaft or axle 7 by means of a sprocket-chain 30, passing therearound and beneath the sprocket-wheel 9. A plate or disk 31 is secured to the shaft 28 at an intermediate point and is provided with laterally-extending pins 32, forming tappets, which are located in the front end of the path of the pole 23, so as to engage with the latter and effect a vibration of the hopper 22 when the implement is in motion. These pins or tappets 32 may be disposed at any distance apart and provided in any desired number and have adjustable connection with the plate or disk 31, whereby their relative position may be changed and provision had for applying a greater or less number, according as it is required to vibrate the hopper 22 more or less frequently during a complete revolution of the tappet-wheel 31. The pins 32 may be threaded into the disk 31 or secured thereto in any desired manner to admit of their ready detachment when required.

An auxiliary hopper 33 is located below the discharge end of the vibrating hopper 22 and receives the fertilizer and directs the latter into a spout 34, by means of which the fertilizer is conveyed into the furrow or trench into which the seed has been deposited. This auxiliary hopper 33 is located at the upper end of the rear wall of the seed-hopper 10, and its walls converge so as to prevent the lodgment of any fertilizer therein. The upper portion of the rear wall of the seed-hopper 10 constitutes the rear wall of the auxiliary hopper 33 and has a notch 35 formed therein and constituting the discharge-opening for the fertilizer from the auxiliary hopper. The spout 34 is applied to the rear side of the rear wall of the hopper 10 and terminates a suitable distance below the seed-hopper to insure the proper distribution of the fertilizer.

The seed and fertilizer are covered by means of a drag 36, consisting of a board or plate having its lower edge cut away at a middle point and spring-arms 37, attached at their forward ends to the bearings 38, in which the shaft or axle 7 is journaled, and having their rear ends attached to the terminal portions of the drag.

The machine is designed for planting a variety of grain and simultaneously depositing fertilizer in the same furrow or hill. The agitator particularly adapts the implement for planting cotton-seed, since it serves to prevent banking thereof in the hopper and acts in the capacity of a force-feeder to insure positive ejection of the seed through the opening 12. It is to be understood that either seed or fertilizer may be independently deposited or jointly, as required. As the machine is drawn over the field the hopper 22 has a vibratory movement imparted thereto due to the pins or tappets 32 successively engaging with the front end of the pole 23 and lifting the same a short distance, when the pole will drop after clearing the tappets and strike the cross-bar 24 and impart a jar or jolt to the fertilizer, which will insure its passing through the meshes of the screen 27 and its discharge from the hopper through the opening 25 into the auxiliary hopper 33 and from thence to the ground through the spout 34.

Having thus described the invention, what is claimed as new is—

1. In an agricultural implement of the character set forth, the combination with a frame, of a shaft carrying a ground-wheel and a sprocket-wheel, a vibratory hopper having a limited tilting movement and provided at its rear with a discharge-opening and at its front with a forwardly-projecting arm, a second shaft arranged in advance of said hopper and carrying a sprocket-wheel and a tappet-wheel having a series of spaced pins to engage said arm and vibrate the hopper, and a chain connecting the two sprocket-wheels to communicate motion from the ground-wheel shaft to the tappet-wheel, substantially as described.

2. In an agricultural implement of the character set forth, the combination, with a main frame, of a supplementary frame rising therefrom, a seed-hopper mounted upon the rear of the main frame, a shaft passing through the hopper and carrying an agitator and having at one end a crank, a shaft journaled at the front of the main frame and carrying a ground-wheel and having at one end a crank-shaft and at the other end a sprocket-wheel, a fertilizer-hopper mounted above the seed-hopper on said supplementary frame to have a limited vibratory movement and provided with a rear discharge and a forwardly-projecting arm, a shaft journaled at the front of said supplementary frame and carrying a sprocket-wheel and a tappet-wheel having spaced pins to engage said arm and vibrate the hopper, a rod connecting the cranks of the agitator and ground-wheel shafts, and a chain connecting the sprocket-wheels of the ground and tappet wheel shafts, substantially as described.

In testimony whereof I affix my signature in presence of two witnesses.

GEORGE W. SNIPES. [L. S.]

Witnesses:
CHAS. AKERMAN,
JOE M. FORDHAM.